United States Patent [19]

Snell

[11] Patent Number: 5,687,293

[45] Date of Patent: Nov. 11, 1997

[54] METHOD AND DEVICE FOR CALIBRATION OF MOVEMENT AXES OF AN INDUSTRIAL ROBOT

[75] Inventor: John-Erik Snell, Västerås, Sweden

[73] Assignee: Asea Brown Boveri AB, Västerås, Sweden

[21] Appl. No.: 328,447

[22] Filed: Oct. 25, 1994

[30] Foreign Application Priority Data

Nov. 15, 1993 [SE] Sweden ................. 9303757

[51] Int. Cl.$^6$ ................. B25J 9/22; G06F 15/46
[52] U.S. Cl. ................. 395/89; 318/568.13
[58] Field of Search ................. 395/89; 318/568.13

[56] References Cited

U.S. PATENT DOCUMENTS

| | | | |
|---|---|---|---|
| 3,909,600 | 9/1975 | Hohn | 235/151.11 |
| 3,920,972 | 11/1975 | Crowin, Jr. et al. | 235/151.11 |
| 4,811,248 | 3/1989 | Senoh et al. | 364/148 |
| 4,831,232 | 5/1989 | Andersson et al. | 318/577 |
| 4,875,177 | 10/1989 | Jarman | 364/559 |
| 4,979,127 | 12/1990 | Mizuno et al. | 364/167.01 |
| 5,056,031 | 10/1991 | Nakano et al. | 364/461 |
| 5,528,116 | 6/1996 | Snell | 318/568.13 |

FOREIGN PATENT DOCUMENTS

| 9000273 | 1/1990 | Sweden. |
|---|---|---|
| WO 93/11915 | 6/1993 | WIPO. |

*Primary Examiner*—George B. Davis
*Attorney, Agent, or Firm*—Watson Cole Stevens Davis, P.L.L.C.

[57] ABSTRACT

In a calibration method for an industrial robot (2–6), a calibration tool (8) supported by the robot hand (6) is brought into contact a spherical calibration body (7) with a known radius. Thereafter, the output signals from the position transducers of the robot axes are read and stored. This method is repeated a plurality of times with different robot configurations. Thereafter, the calibration parameters of the robot are calculated starting from the kinematic equations of the robot, a model of the relationship between axial position and position transducer signal, the known radius of the calibration body, and the read and stored position transducer signals.

7 Claims, 8 Drawing Sheets

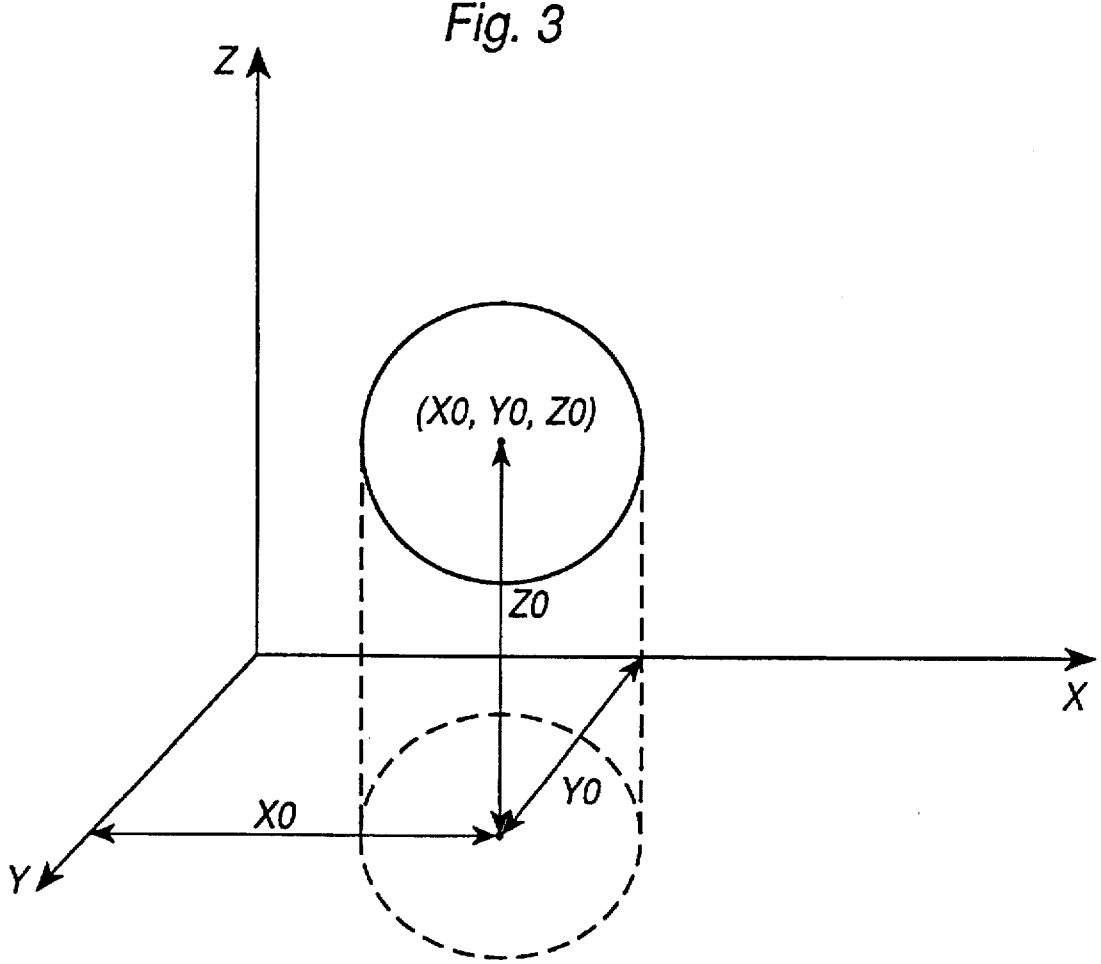

METHOD AND DEVICE FOR CALIBRATION OF MOVEMENT AXES OF AN INDUSTRIAL ROBOT

TECHNICAL FIELD

The invention relates to a method for calibration of a number of movement axes of an industrial robot, which has a plurality of movement axes with a position transducer for each one of the axes which is adapted to supply an output signal which defines the current position of the axis, and a robot hand for supporting a tool.

The invention also relates to an industrial robot system with an industrial robot which has a plurality of movement axes with a position transducer for each one of the axes which is adapted to supply an output signal which defines the current position of the axis, a robot hand for supporting a tool, and a control system for controlling the position and orientation of the robot hand in accordance with a program and adapted to receive the output signals of the position transducers.

BACKGROUND ART

A typical industrial robot is previously known from U.S. Pat. No. 3,909,600 and U.S. Pat. No. 3,920,972. Such a robot has a stand which is rotatably arranged on a foot and which supports a first robot arm which is rotatable in relation to the stand. In the outer end of this arm, and rotatable in relation thereto, a second robot arm is arranged. In its outer end this second arm supports a hand which is provided with a tool attachment and which is rotatable in two or three degrees of freedom in relation to the other arm. The robot is provided with control equipment for controlling the position and orientation of the robot hand. For each one of the above-mentioned axes of rotation, servo equipment comprising a driving motor and a position transducer is provided, the position transducer delivering a signal which is a measure of the angle of rotation of the current axis in relation to a reference position. To the servo system of each axis there is supplied a desired value for the angle of rotation of the axis, and the driving motor of the axis causes the robot to move in the current axis until the angular position indicated by the position transducer of the axis corresponds to the desired value supplied to the servo system.

For the position and orientation of the robot hand to correspond to the desired position and orientation, the mechanical structure of the robot and the data which describe it must be known with a high accuracy. This means that it is not sufficient for the nominal robot model to be known but also the individual deviations from the nominal model must be known. These deviations may be: variations in arm lengths, deviations in the orientations of the axes of rotation of the joints, and lateral displacements (offset) of the axes. These deviations arise in the manufacture of the different mechanical components and in the assembly of these. To this is also to be added that the angle indicated by the position transducer of an axis must with great accuracy correspond to the actual angle of rotation of that mechanical part of the robot which is controlled with the aid of the axis in question.

Because of difficulties in carrying out the calibration in a manner which is economical and adapted to production, the currently normal method is only to consider the nominal structure of the robot for describing the geometry of the robot.

For determining the relationship between the position transducer signals of the robot axes and the actual angles of rotation of the arms of the robot, different forms of calibration methods are used.

In one such calibration method, the robot is caused to assume such a position that the actual angles of rotation in the different axes are known, whereupon the angles of rotation indicated by the position transducers are compared with the actual angles. The position transducers may thereafter be adjusted such that the angles indicated thereby correspond to the actual angles. Alternatively, the deviations between the indicated angles and the actual angles may be stored and then be used during operation for correction of the output signals from the position transducers.

According to a previously known calibration method, the different parts of the robot are set at predetermined initial positions with the aid of a water-level which is mounted on accurately finished projections, provided for that purpose, on the different parts of the robot. In the initial position, for example, the above-mentioned first arm may be vertical, the second arm and the hand horizontal etc. In this so-called synchronization position, the actual angles in the different axes of the robot are in this way known, the angles indicated by the position transducers may be read off, and for each axis a so-called offset value may be determined which constitutes the difference between the known actual angle and the angle received from the position transducer. However, this method requires mounting of special additional equipment (the water-levels). Further, the different parts of the robot must be designed such that an accurate mounting of the water-levels is made possible, which entails an increased cost of the mechanical parts of the robot. The calibration method must be carried out manually and requires a relatively considerable time expenditure. Further, the method has a limited accuracy.

From Swedish patent application 9000273-4 a calibration method is known in which a parallelepipedic calibration body is used, the position of which in the base coordinate system of the robot must be known. A calibration tool mounted on the robot hand is brought into contact with the calibration body in a number of different robot configurations. Thereafter, the offset values of the position transducer of the robot are calculated on the basis of the kinematic equations of the robot, a model of the relationship between axial position and position transducer signal, the coordinates in the basic system which are known in the calibration positions, and the read and stored position transducer signals. A disadvantage of this method is that the position of the calibration body must be accurately known. It is normally difficult, in a robot installation in practice, to arrange a calibration body such that its side surface has known coordinates without the use of external measuring equipment.

From Swedish patent application 9103642-6 it is known to use a calibration body with pairwise opposite side surfaces with a known edge length, the position of which in the base coordinate system of the robot need not be known. The measurements are carried out pairwise on opposite side surfaces, which means that each measurement is carried out twice. A disadvantage of this method are the pairwise measurements which double the necessary number of measurements and which render difficult the execution of the calibration. The manufacture of a calibration body with exact edge lengths is complicated and therefore becomes expensive.

SUMMARY OF THE INVENTION

The invention aims to provide a calibration method which does not require extensive additional equipment for the calibration, which provides a high accuracy in the calibration, which is possible to carry out automatically and hence rapidly and inexpensively, which is independent of how the robot is erected, and which provides a possibility of compensating for geometrical defects in the mechanical parts.

The invention also aims to provide an industrial robot system with means for carrying out the above-mentioned method.

What characterizes a method and an industrial robot system according to the invention will become clear from the appended claims.

BRIEF DESCRIPTION OF THE DRAWINGS

In the following the invention will be described in greater detail with reference to the accompanying FIGS. 1–8.

FIG. 3 shows the calibration body in the base coordinate system of the robot.

DESCRIPTION OF THE PREFERRED EMBODIMENTS

Figure 1:
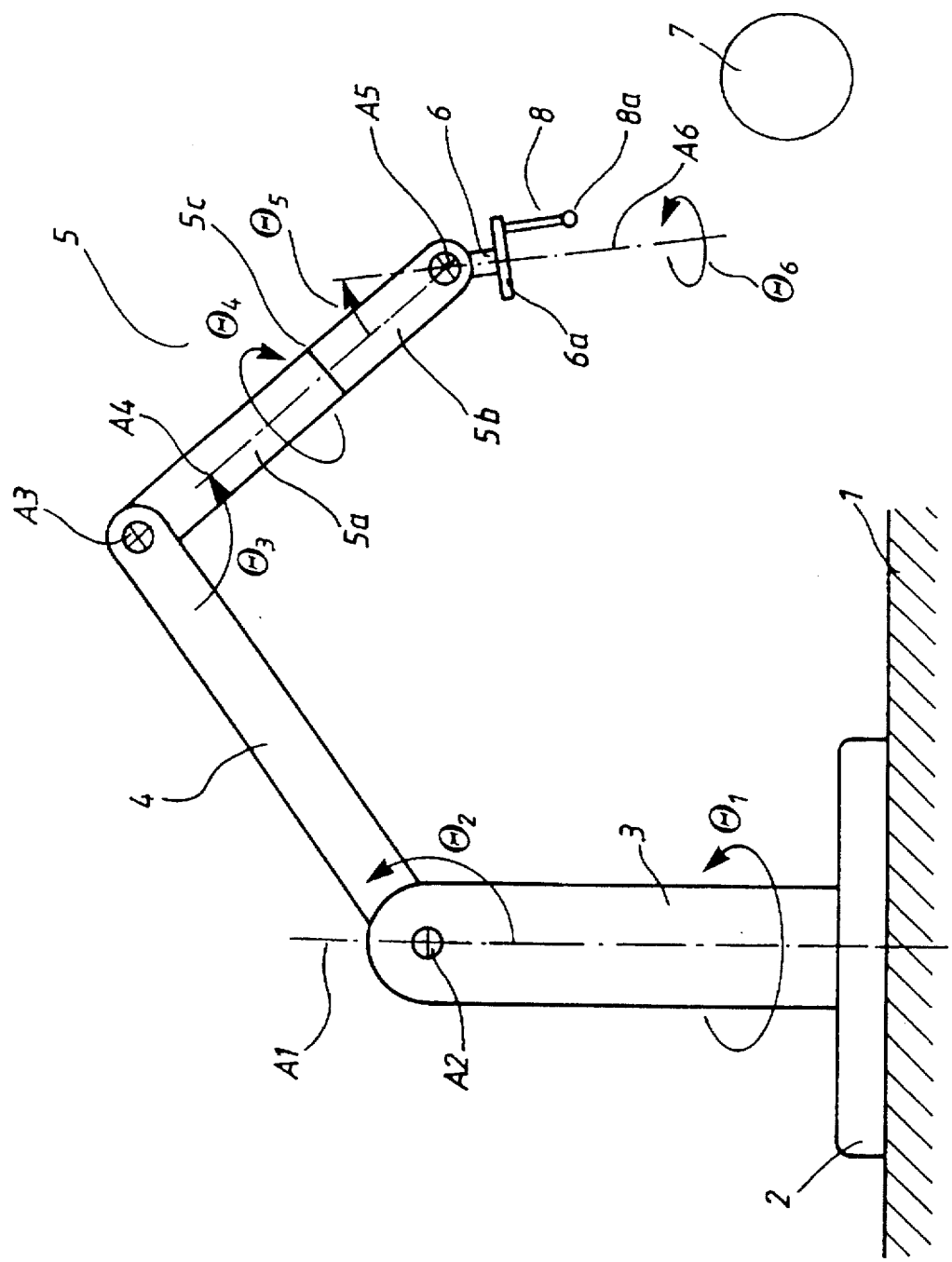
FIG. 1 schematically shows an industrial robot with a calibration body and a calibration tool according to the invention.

FIG. 1 shows an example of an industrial robot, known per se, for the calibration of which the method according to the invention can advantageously be used. On a base 1 the robot foot 2 is fixedly mounted. The robot has a stand 3, which is rotatable in relation to the foot 2 around a vertical axis A1. In the upper end of the stand a first robot arm 4 is journalled and rotatable in relation to the stand around a second axis A2. In the outer end of the arm a second arm 5 is journalled and rotatable in relation to the first arm around an axis A3. The robot arm 5 comprises two parts 5a and 5b, of which the outer part 5b is rotatable in relation to the inner part 5a around an axis of rotation A4 coinciding with the longitudinal axis of the arm. In its outer end the arm 5 supports a so-called robot hand 6, which is rotatable around an axis of rotation A5 perpendicular to the longitudinal axis of the arm. The robot hand comprises a tool attachment 6a. The outer part of the robot hand and hence the tool attachment 6a are rotatable in relation to the inner part of the robot hand around an axis of rotation A6. The angles of rotation in the six rotational axes A1 . . . A6 are designated θ1 . . . θ6 in the figure. Within the working range of the robot there is arranged a calibration body 7. This body has the shape of a sphere with a known radius.

Figure 2:
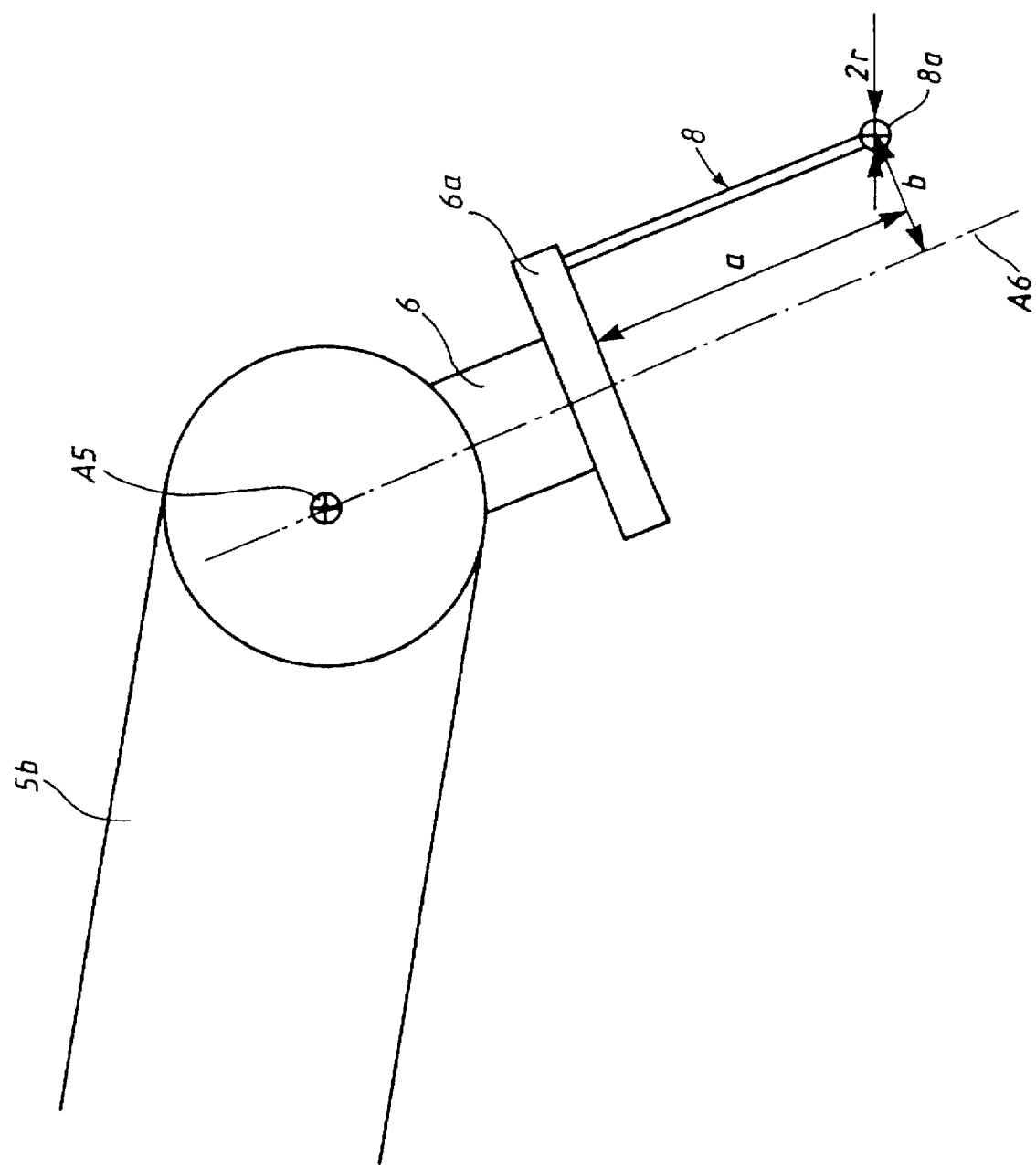
FIG. 2 shows in more detail a calibration tool for carrying out the method according to the invention.

FIG. 2 shows in more detail the robot hand 6, the tool attachment 6a and the calibration tool 8 mounted on the tool attachment. The tool is mounted eccentrically on the tool attachment in relation to the axis of rotation A6 of the attachment. In its outer end the tool supports a spherical contact body 8a. The radius r of the contact body and the distances a from the tool attachment and b from the axis of rotation of the attachment in the centre of the contact body are assumed to be known.

FIG. 3 shows the so-called base coordinate system of the robot, which system is an orthogonal coordinate system with the z-axis coinciding with the axis of rotation A1 in FIG. 1 and with the x-axis and the y-axis in predetermined directions in relation to the robot foot 2. The calibration body 7 is placed completely arbitrarily within the working range of the robot. The radius may be arbitrary but shall be known.

The coordinates X0, Y0, Z0 for the centre of the sphere need not be known. These three coordinates constitute three unknown parameters and must be added to the number of calibration parameters which are to be calibrated.

In the calibration method according to the invention, a number of measurements are carried out. The number of measurements is to be at least as great as the number of unknown parameters, that is, the number of calibration parameters to be calibrated plus three. The number of measurements may, however, advantageously be higher, preferably considerably higher, thus obtaining an increased accuracy in the calibration. The calibration method according to the invention also tends to provide higher accuracy the greater the differences are between the configurations used.

During each measurement, the robot is first run—manually or automatically—to a configuration where the contact body 8a is at a point at some distance from the calibration body. The robot is then run such that the contact body moves in a direction towards the calibration body until they make contact with each other. This movement can be carried out in a manner known per se by means of a search method which interrupts the movement upon contact with or with the aid of a so-called soft servo which, per se, strives to continue the movement after contact but which can only apply a limited force to the calibration tool. When contact has been achieved, the output signals from the position transducer of the robot are read and stored.

Figure 4A:
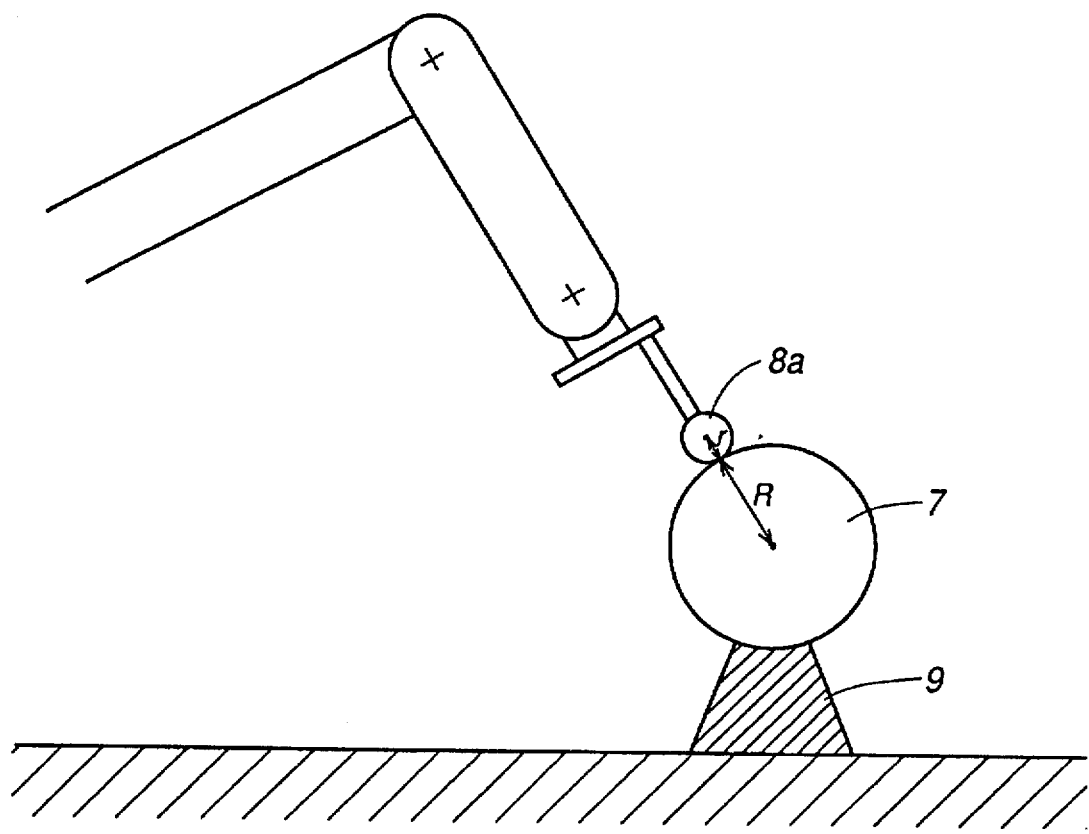
FIGS. 4a, 4b and 4c show examples of different positions assumed by the calibration tool when carrying out the calibration method.
Figure 4B:
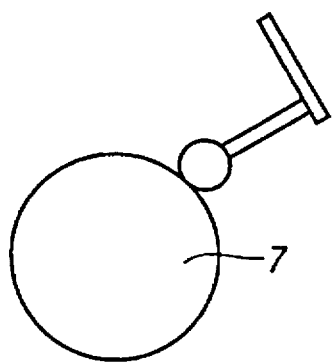
Figure 4C:
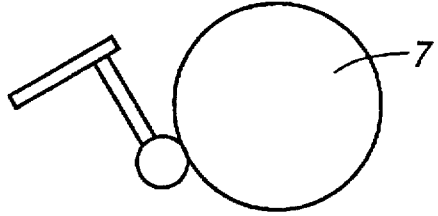

Measurements are suitably carried out at a number of different points on the calibration body with different configurations of the robot. The configuration of the robot is defined by its axis angles, and one configuration differs from another if at least some of the axis angles is changed. FIGS. 4a–4c show examples of different robot configurations when measuring three different points on the calibration body.

The calibration body is suitably placed on some form of stand 9. It is an advantage if the stand is raisable and lowerable. The accuracy of the calibration can be increased by calculating the calibration parameters several times with the sphere in varying positions in the working range of the robot. With a raisable and lowerable stand, the position of the sphere in the vertical direction may be varied. The calibration parameters may, for example, be calculated as a mean value of the calibration parameters calculated for the different positions.

As position transducers in industrial robots resolvers are usually used, and the calibration method according to the invention will be described below as applied to an industrial robot with this type of position transducer. However, the invention can be applied also to robots with other types of position transducers. The calibration parameters which need to be identified are for each degree of freedom of the robot (cf. FIG. 8)

Offset coordinate for arm link (OX, OY, OZ)

Obliquity of axis of rotation of arm link (Y, P)

Offset value of position transducer of axis of rotation (K2)

Coordinates for the centre of the calibration body Q0=X0, Y0, Z0.

For a 6-axis robot this provides altogether 39 parameters which are to be identified. Thus, altogether 39 positionings to the calibration body are required. For each positioning, the position transducer of the robot is read.

The relationship between the coordinates for the position of the calibration tool and the arm angles of the robot, the kinematic model of the robot, can be expressed as $$f_x(\theta)=x$$

$$f_y(\theta)=y$$

$$f_z(\theta)=z$$

The arm angle ($\theta$) can be expressed in the deflection $\emptyset$ of the position transducers through $$\theta = K1 \cdot \emptyset + K2$$

where

K1 is the exchange in the transmission between arm angle and measuring transducer (K1 is known), K2 is an unknown offset value.

Since the distance between the position of the calibration tool and the centre of the calibration body is known, r+R, the following equation may be set up $$(F_x(\theta)-X0)^2+(f_y(\theta)-Y0)^2+(f_z(\theta)-Z0)^2=(r+R)^2$$

After insertion of the expression for arm angle $\theta$ and the read out values for the measuring transducers $\emptyset$ for the current measuring pair, the equation may be expressed as $$g(K21, K22, K23, K24, K25, K26, OX1, OX2, OX3, OX4, OX5, OX6, OY1, OY2, OY3, OY4, OY5, OY6, OZ1, OZ2, OZ3, OZ4, OZ5, OZ6, Y1, Y2, Y3, Y4, Y5, Y6, P1, P2, P3, P4, P5, P6, X0, Y0, Z0)=(r+R)^2$$

or, written in a more compact way, $$g(K2, OX, OY, OZ, Y, P, Q0)=(r+R)^2$$

In this way at least 39 equations are generated.

The calculation of the unknown calibration parameters from the non-linear equation system may be made according to the following:

First, preliminary values of the calibration parameters are assumed. The offset values K2 may be obtained by bringing the robot to an initial position, whereupon vernier scales on each axis are read and the differences between the read values and the resolver angles are formed. In this position, also the initial speed for the resolvers is determined (the speed is set to zero), and Q0=X0, Y0, Z0 is estimated. The other calibration parameters are set to zero (nominal robot). For each measurement j, the distance between the centre of the calibration tool and the centre of the sphere is calculated, based on the read out resolver values and on the kinematic model of the robot. The difference $\epsilon_j$ between the value thus calculated and the known distance r+R is formed. When these differences have been formed for all the measuring pairs, a quantity $\epsilon=\sqrt{(\epsilon_1^2+\epsilon_2^2+\ldots+\epsilon_{39}^2)}$ is determined.

The quantity $\epsilon$ is then compared with a predetermined tolerance value. If $\epsilon$ is greater than this value, the set values are adjusted according to the Newton-Gauss algorithm for solution of overdetermined non-linear equation systems, and the above procedure is repeated until $\epsilon$ is lower than the tolerance value. Finally, the calibration parameters thus determined are stored to be used for correcting the position of the robot during operation.

To make it possible to determine the unknown parameters, the number of measurements must be at least as great as the number of parameters which are to be calibrated. In the case described above it has been assumed that all the six axes of the robot are to be calibrated and the smallest possible number of measurements, namely 3+6·6=39, has been assumed. It may be suitable, however, to carry out a considerably larger number of measurements with different configurations, which has proved to provide an improved accuracy in the calibration.

Figure 5:
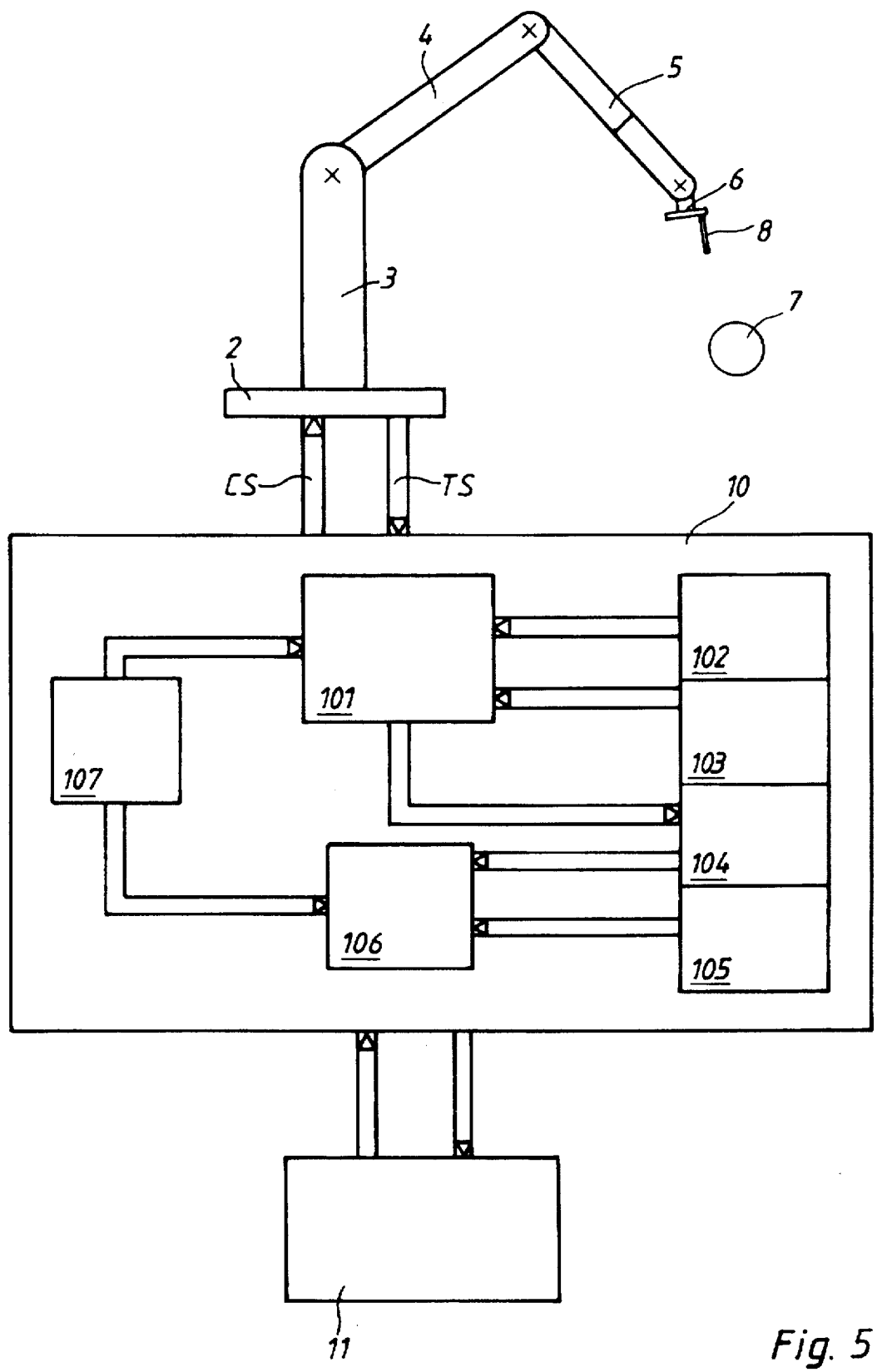
FIG. 5 shows the configuration of an industrial robot system with means for carrying out the method according to the invention.

FIG. 5 shows, in principle, the configuration of an industrial robot system with control means for automatically carrying out the calibration method described above. The robot 2–6 is provided in the manner described above with a calibration body 7 and a calibration tool 8. The control equipment 10 of the robot comprises, in a known manner, computer equipment with the necessary memories for programs and other data, drive members for the driving motors of the different robot axes as well as the necessary supply equipment. The control equipment 10 is connected to a programming unit 11 for programming and other operation of the robot. Of the control equipment, FIG. 5 shows the program executor 101, which in a known way causes the robot to carry out a stored program. In a memory 107 the kinematic model of the robot is stored. In a memory 102 the movement program for the calibration procedure is stored. In a memory 103 there are stored, prior to the automatic calibration procedure, values of the preliminary calibration parameters. A memory area 104 is intended for storage of the resolver values which are read off during each measurement when carrying out the calibration method. In a further memory area 105 there are stored, prior to the automatic calibration procedure, the necessary basic data such as the radius R of the calibration body 7 and the length and radius r of the calibration tool. Further, the control equipment comprises calculating means 106 which, when all the measurements have been executed, on the basis of the read-off resolver values, the kinematic model and basic data from the memory 105, calculate the calibration parameters in the manner described above. The control equipment delivers the necessary control signals CS to the robot and receives from the robot resolver values TS.

Figure 6:
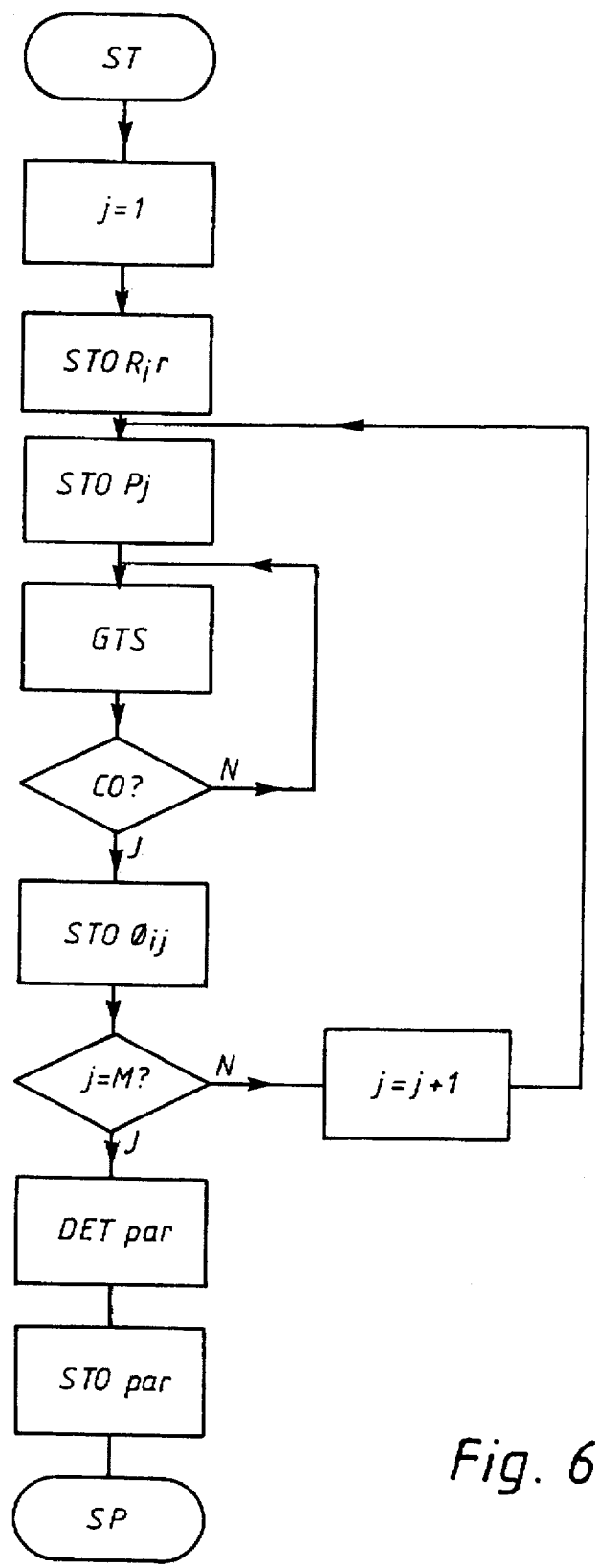
FIG. 6 shows in the form of a flow diagram an example of a program for automatically carrying out the calibration method.

Prior to the calibration, a calibration program is stored, for example once and for all, into the memory area 102. The program is adapted to control the movements and other functions of the robot during the calibration procedure. Further, there are stored in the memory area 103 preliminary values for the calibration parameters, and in the memory area 105 the radius R of the calibration body as well as the radius r of the calibration tool. The configuration of the calibration program is shown in FIG. 6. The quantity j indicates the current measurement and it is assumed that M measurements are to be carried out. After start-up of the program—ST—j is set equal to 1. Thereafter, there are stored in the working memory of the equipment the radius R of the calibration body and the radius r of the calibration tool (STO R, r) as well as coordinates for an initial point (block STO $P_j$). This information indicates in what direction the calibration tool is to be moved from the initial point to make contact with the calibration body. After this, the robot is moved—block GTS—in a direction towards the calibration body. In block CO? it is sensed whether contact has been obtained with the calibration body. If the answer is no, the movement continues, and if the answer is yes, the resolver values $\emptyset_{ij}$—block STO $\emptyset_{ij}$ (i=axis number)—are stored in the memory area 104. Thereafter, it is investigated, in block j=M?, whether all desired measurements have been carried out. If this is not the case, j=j+1 is set and the next measurement is carried out. When all the measurements have been carried out, that is, when j=M, the program proceeds to a calculation method, DET par, in which the calibration parameters are determined. The parameters thus determined are then stored—STO par—for later use in operation of the robot. After this, the program is terminated—block SP.

Figure 7:
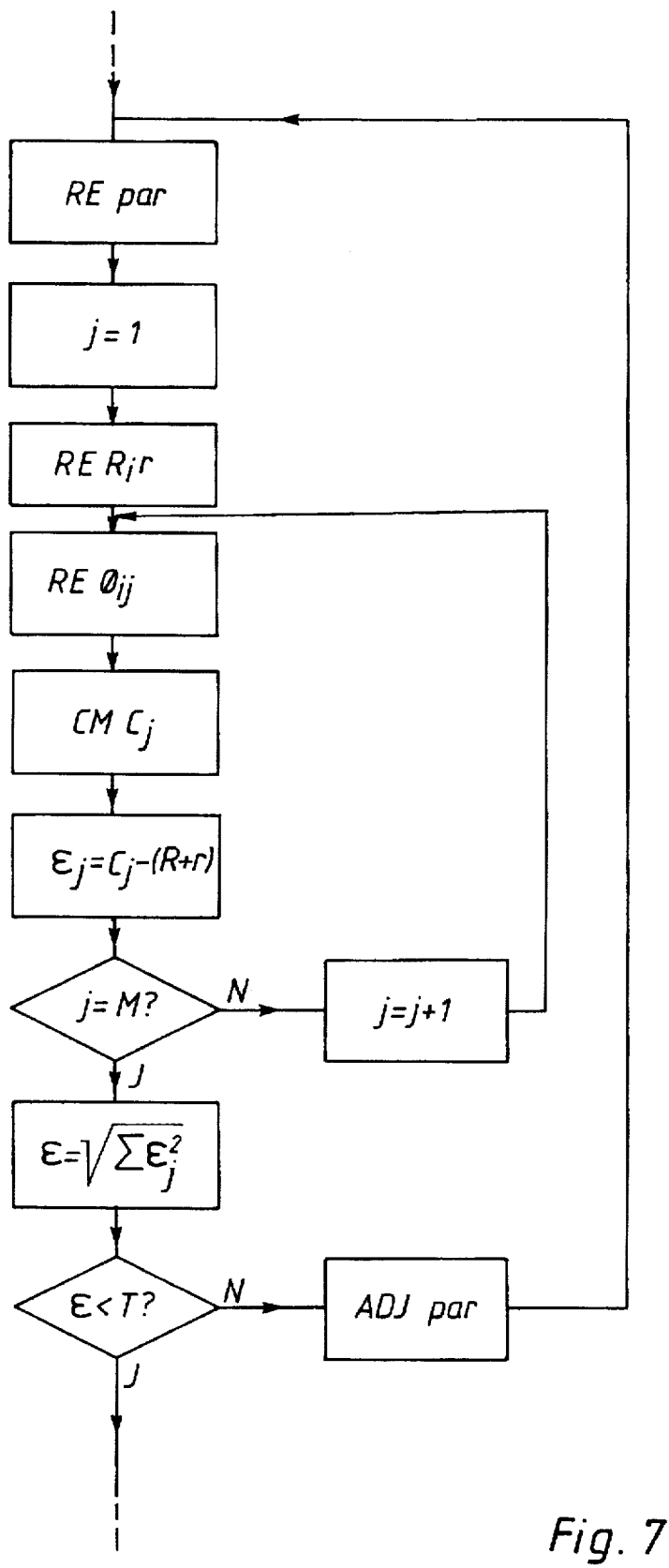
FIG. 7 shows in the form of a flow diagram the principle of carrying out the calculations with the aid of which, as a result of the calibration method, the calibration parameters are obtained.

FIG. 7 shows in more detail the configuration of the functional block DET par. The calculation starts with a reading of current values of the calibration parameters, block RE par. The first time these values are obtained from the memory area 103, where the preliminary calibration parameters are obtained. Then j is set at j=1, that is, the first measurement is selected. The radius R of the calibration body and the radius r of the calibration tool are stored in the working memory. The resolver values $\emptyset_{ij}$ read off and stored for this measurement, are read off. This is performed in blocks RE R, r and RE $\emptyset_{ij}$. Thereafter there is calculated for the current measurement, starting from the kinematic model of the robot, the distance $C_j$ between the centre of the calibration tool and the centre of the calibration body. Then the difference $\epsilon_j = C_j - (R+r)$ is formed. Then—at j=M?—it is sensed whether all the measurements have been completed. If this is not the case, j is set at j=j+1 and the corresponding calculation is carried out for the next measurement. When all the measurements have been completed, j=M and a quantity $\epsilon = \sqrt{(\epsilon_1^2 + \epsilon_2^2 + \ldots \epsilon_M^2)}$ is formed. If this quantity amounts to or exceeds a predetermined tolerance value T, this is an indication that the used values for the calibration parameters are incorrect. In that case, these values are adjusted, for example according to the above-mentioned Newton-Gauss algorithm, in block ADJ par, whereupon the calculation is repeated. This method is repeated with successive adjustments of the calibration parameters and subsequent determinations of the error $\epsilon$ until the latter quantity is lower than the predetermined tolerance level. When this is the case, the program proceeds to the next block in FIG. 6, where the last used values of the calibration parameters are stored.

FIG. 8 shows calibration parameters for a robot axis. The figure shows the nominal coordinate system of an axis, $X_{nom}$, $Y_{nom}$, $Z_{nom}$, as well as its actual coordinate system $X_{act}$, $Y_{act}$, $Z_{act}$. The latter deviates from the former by an offset error and by an attitude error.

Figure 8A:
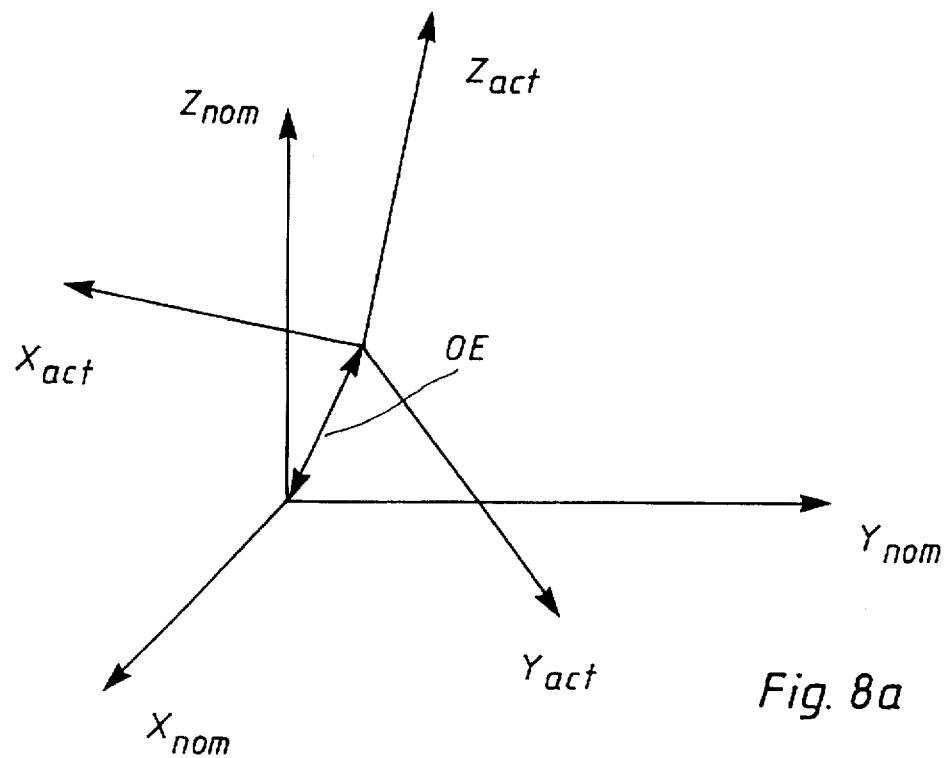
FIGS. 8a and 8b illustrate the calibration parameters for a robot axis.

As shown in FIG. 8a, the position of the origin of coordinates in the actual coordinate system is indicated by a vector OE. This vector has three components and is expressed in the nominal coordinate system.

Figure 8B:
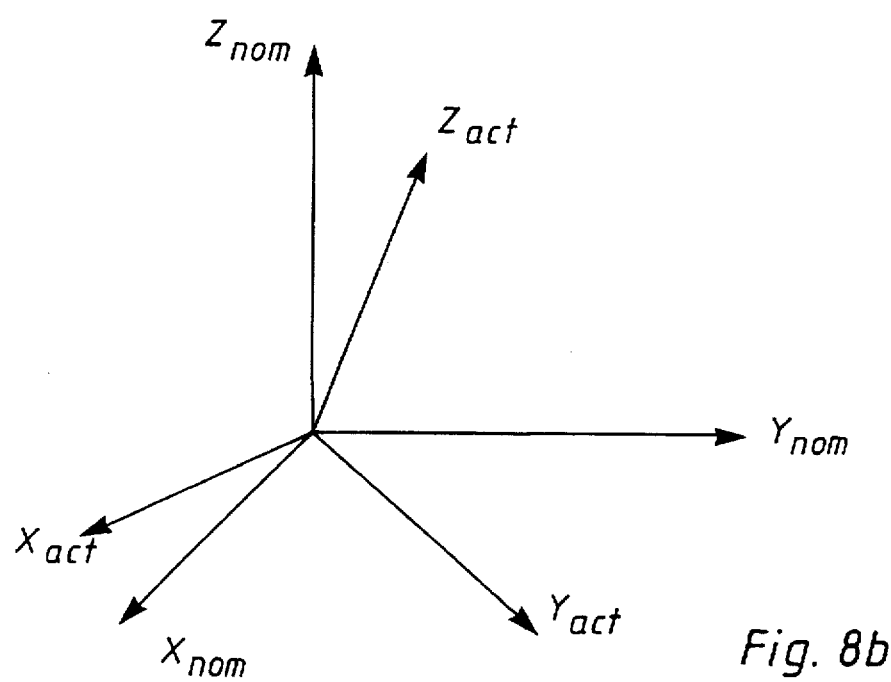

As shown in FIG. 8b, the actual coordinate system has an attitude error in relation to the nominal system. Three angles are required to rotate the actual system into agreement with the nominal one, and these three angles indicate the attitude error.

The three components of the offset vector OE and the three angles of the attitude error constitute the six calibration parameters of the robot axis in question.

The invention has been described above in connection with an industrial robot with rotating axes only, but the invention can be applied with the same advantage to robots with linear axes only, or with a combination of linear and rotating axes. Also, the method according to the invention is applicable to robots with a number of axes different from that described above. Further, it has been described above how the method is used for calibration of all the axes of the robot. It may sometimes be suitable to refrain from calibration of one or more of the robot axes. To achieve the greatest possible variation between the robot configurations used, the robot can be provided with several calibration bodies arranged at different locations within the working range of the robot, which locations are selected such that the greatest possible differences are obtained between the robot configurations at the different measurements. In the preferred embodiment of the invention described above, the calibration tool is caused during the calibration to make mechanical contact with a calibration body.

It has been described above how six calibration parameters are determined for each robot axis. The number may be greater, for example if during the calibration it is also desired to take into account non-linearities of the position transducer of the axis. The number may also be smaller, for example if it is known from experience that one or more of the calibration parameters are known or of a negligible magnitude.

The advantages of using a sphere as calibration body instead of a calibration body with pairwise opposite side surfaces are that a) no pairwise positioning is needed b) the number of necessary measurements is halved c) a sphere with a constant radius is lighter, that is, less expensive, to manufacture.

I claim:

1. A method for calibration of an industrial robot comprising a plurality of movement axes with a position transducer for each of said axes for supplying an output signal which defines the current position of the axis, and a robot hand for supporting a tool, wherein a number of calibration parameters for the robot are determined by:

a) providing the robot with a calibration tool supported by the robot hand, b) running the calibrating tool into contact with a spherical calibration body which has at least one accurately known radius dimension, c) reading and storing, in contact positions, the output signals from the position transducers of the robot, d) repeating steps b) and c) a number of times at least equal to the number of calibration parameters plus three, and wherein, initial conditions for determining the calibration parameters, include:

1) kinematic equations of the robot, 2) a model of the relationship between axial position and a position transducer signal, 3) the radius of the calibration body, and 4) the read and stored output signals from the position transducers.

2. A method according to claim 1, wherein the calibration body includes an arbitrary and unknown position within a working range of the robot.

3. A method according to claim 1, wherein the calibration method is carried out at least twice with the calibration body in different positions within a working range of the robot.

4. An industrial robot system operable in accordance with calibration parameters comprising:

a plurality of movement axes with a position transducer for each one of said axes for supplying an output signal which defines the current position of an axis, a robot hand for supporting a tool, a control system for controlling the position and an orientation of the robot hand in accordance with a program for receiving the output signals of the position transducers, a calibration tool supported by the robot hand, a calibration body which has at least one accurately known dimension, wherein said calibration body has a spherical shape and an accurately known radius, and wherein a calculating means calculates the calibration parameters based upon:
1) kinematic equations of the robot,
2) a model of the relationship between an axial position and a position transducer signal,
3) the radius of the calibration body and
4) the read and stored output signals from the position transducers.

5. An industrial robot system according to claim 4, wherein said calibration tool comprises a spherical contact body for mechanical contact with the calibration body.

6. An industrial robot according to claim 4, wherein said calibration body is arranged with an arbitrary and unknown position within the working range of the robot.

7. An industrial robot system according to claim 4, further comprising storage means for storing a calibration program for automatically carrying out the calibration.

* * * * *